Aug. 9, 1938.   M. SCUDDER   2,126,220
METHOD OF MAKING AN INFLATABLE BALL EQUIPPED WITH AN OUTER COVER
Original Filed Jan. 27, 1937

INVENTOR;
MASON SCUDDER
BY
ATTORNEY

Patented Aug. 9, 1938

2,126,220

UNITED STATES PATENT OFFICE 2,126,220

METHOD OF MAKING AN INFLATABLE BALL EQUIPPED WITH AN OUTER COVER

Mason Scudder, St. Louis, Mo., assignor to Rawlings Manufacturing Company, St. Louis, Mo., a corporation of Missouri Original application January 27, 1937, Serial No. 122,540. Divided and this application April 26, 1937, Serial No. 139,013

4 Claims. (Cl. 154—16)

This invention relates to inflatable balls, such as basket-balls, foot-balls, volley-balls, and the like, my present application being a division of my pending application, Ser. No. 122,540, filed January 27, 1937.

The object of my present invention is to provide a novel method for making a ball equipped with a leather outer cover or casing which is of such construction that the ball is truly symmetrical and free from "flat spots".

Figure 1 of the drawing is a perspective view partly broken away of a ball produced by my improved method of manufacture.

Figure 1:
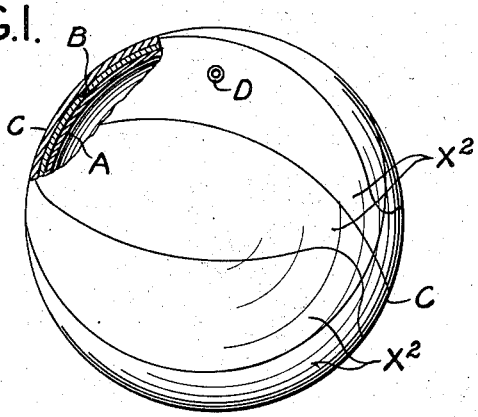

The ball that is produced by my improved method is composed of an inflatable bladder A, a seamless rubber shell B of any preferred construction that encases said bladder and a leather outer casing or cover C that surrounds the shell B. The bladder A is provided with an air valve or equivalent device D accessible from the exterior of the casing for inflating the bladder as shown in Figure 1. Usually the seamless rubber shell B will be made of canvas, felt or some other suitable non-stretchable sheet material to which a coating of rubber or rubber composition is applied and molded in any suitable way to produce a reinforced rubber shell but the particular kind of shell B with which the ball is equipped is immaterial so far as my present invention is concerned.

Figure 2:
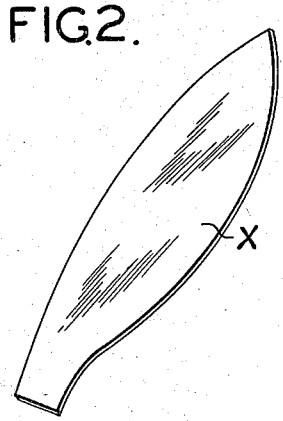
Figure 2 is a perspective view of one of the sections of the leather outer casing of the ball, after said section has been cut out of a sheet of leather.
Figure 3:
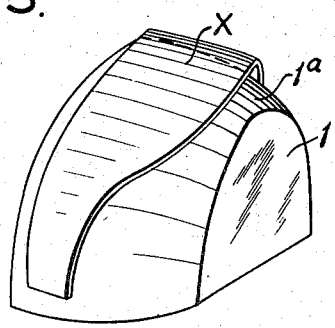
Figure 3 is a perspective view illustrating the section shown in Figure 2 applied to one member of the mold in which said section is pre-shaped or molded.

The leather outer casing C of the ball is of novel construction in that it is composed of a plurality of sections of leather which are molded or pre-shaped without destroying the flexibility of said sections, and thereafter secured by an adhesive or other suitable means to the outer surface of the rubber shell B in such a way that the edges of said leather sections butt against each other, thereby producing an inflatable ball having a flexible or pliable leather outer casing that is devoid of sewed seams and which is of truly symmetrical shape or form. I prefer to construct the leather outer casing C from eight sections, although it may be formed from four sections or any other desired number of sections without departing from the spirit of my invention. In producing said leather outer casing I first cut the sections constituting same from a sheet of leather so as to obtain flat sections $x$ as shown in Figure 2. Each of said flat sections $x$ is then subjected to pressure, preferably in a heated mold so as to change it from a flat member into a concavo-convex shaped member that is curved both longitudinally and transversely, but which is flexible or pliable like leather. In Figure 3 of the drawing I have illustrated the flat section $x$ placed on a mold member 1 having a convexed surface 1a that is curved in two directions, namely, longitudinally and transversely. Thereafter a concaved mold member 2 is arranged in opposed relation to the mold member 1 so as to convert said section $x$ into a pre-shaped or molded leather member $x'$ as shown in Figure 3. Usually the members of the mold will be heated so as to cause the leather section to be subjected to both heat and pressure.

Figure 4:
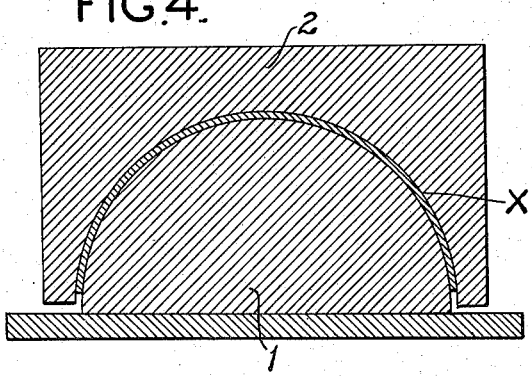
Figure 4 is a sectional view showing the two members of the mold arranged in operative position with the section of the casing interposed between the same.
Figure 5:
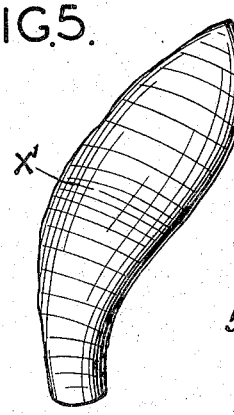
Figure 5 is a perspective view of one section of the outer casing after it has been molded or pre-shaped.
Figure 6:
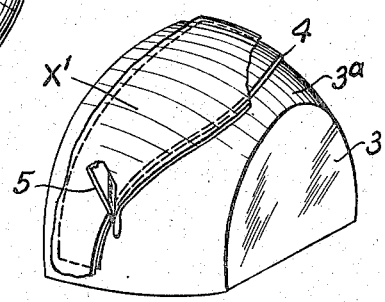
Figure 6 is a perspective view of the device or apparatus that is employed in the operation of trimming off the pre-shaped or molded section.
Figure 7:
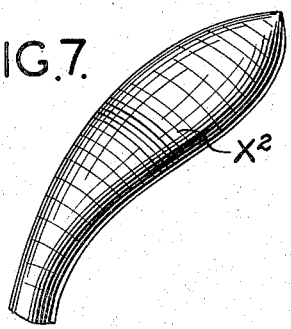
Figure 7 is a perspective view of the trimmed section ready to be applied and secured to the seamless rubber shell of the ball.

At the completion of the molding or pre-shaping operation, it will usually be found that the peripheral edge of the pre-shaped section $x'$ is slightly irregular or uneven and in order to produce a leather outer casing whose sections butt tightly together, it is necessary to trim off the edge of the pre-shaped section $x'$ after it has been removed from the mold. To facilitate this trimming operation and enable it to be performed accurately and quickly even by an unskilled workman, I prefer to use a device of the kind shown in Figure 6 which consists of a supporting member 3 provided with a convexed surface 3a curved in two directions at right angles to each other and equipped with a groove 4 whose shape or outline corresponds to the shape desired for the finished sections of the outer casing. After the pre-shaped section $x'$ has been removed from the mold as shown in Figure 4, said pre-shaped section is mounted on the member 3 in such a way that said section will be substantially surrounded by the groove 4 in the member 3 with any irregularities or uneven portions on the peripheral edge of said section $x'$ lapping over or over-hanging the groove 4. The operator then holds the section $x'$ firmly down on the supporting member 3 and draws a knife blade 5 through the groove 4 as indicated in Figure 6 so as to trim off the uneven edge of the section and thus produces a trimmed, pre-shaped leather section $x^2$ as shown in Figure 7.

Any preferred procedure may be used to apply the finished leather sections $x^2$ to the seamless rubber shell B. The fact that the sections constituting the outer casing are pre-shaped and curved both transversely and longitudinally eliminates the possibility of the casing having "flat spots" in same as would be apt to occur if the casing were composed of leather sections that are applied in a flat condition to the shell B and then worked into position by hand or by pressure applied with the fingers of the operator.

While I have stated that each of the flat sections $x$ is pre-shaped or pre-formed, preferably by means of a heated mold composed of two rigid members between which the section is interposed, I wish it to be understood that any other suitable means could be employed to pre-shape the sections $x$ without departing from the spirit of my invention, so long as the flexibility or pliability of the leather is not destroyed in the pre-shaping operation. For example, the molding or shaping of the pieces $x$ can be done by inflating a heavy bladder inside of a hollow metal sphere so as to cause the pieces $x$ to be curved longitudinally and transversely as previously explained, it being preferable to shape said pieces while they are in a moist or wet condition.

Having thus described my invention, what I claim as new and desire to secure by Letters Patent is:

1. A method of making an inflatable ball equipped with an outer cover, characterized by first cutting out a plurality of flat leather sections, then molding said sections prior to combining them or arranging them in final assembled relationship, so as to impart a transverse and longitudinal curvature to each section without however destroying the flexibility of same, and then applying said sections to a flexible shell that encases an inflated bladder and securing the sections to said shell by an adhesive, with the peripheral edges of said sections in abutting relationship.

2. A method of making an inflatable ball equipped with an outer cover, characterized by first cutting out a plurality of sections from a flat sheet of leather, then while said sections are unattached and not in final assembled relationship, subjecting each of said sections to pressure in a means that imparts a transverse and longitudinal curvature to the section without however destroying the flexibility of same, and then securing said sections by an adhesive, to the exterior of a flexible spherical shell that is held in a distended condition by air pressure.

3. A method of making an inflatable ball equipped with an outer cover, characterized by first producing a plurality of flat leather sections; then while said sections are unattached and in a disassembled condition, molding or pre-shaping each section so as to impart a transverse and longitudinal curvature to same without however destroying the flexibility of same, then trimming off any irregularities on the edges of the sections, and then applying and securing said sections by an adhesive to a flexible shell that surrounds an inflated bladder.

4. In a method of making an inflatable ball equipped with an outer cover, the procedure of individually pre-shaping or pre-forming a plurality of flexible sections of leather, then applying the individual section $s$ to a supporting surface that is curved in two directions at right angles to each other, then individually trimming off any irregularities on the edge of each section while it is positioned on said supporting surface, and thereafter applying and securing said sections by an adhesion to a seamless rubber shell that encases an inflated bladder.

MASON SCUDDER.